United States Patent Office 3,271,397
Patented Sept. 6, 1966

3,271,397
REACTIVE ANTHRAQUINONE DYES CONTAINING A TRICHLORO PYRIMIDYL GROUP
Peter Bitterli, Reinach, Basel-Land, Switzerland, assignor to Sandoz Ltd. (also known as Sandoz A.G.), Basel, Switzerland
No Drawing. Filed June 22, 1965, Ser. No. 466,111
Claims priority, application Switzerland, June 26, 1964, 8,361/64; Jan. 29, 1965, 1,275/65
7 Claims. (Cl. 260—256.5)

This invention relates to reactive dyes of the formula

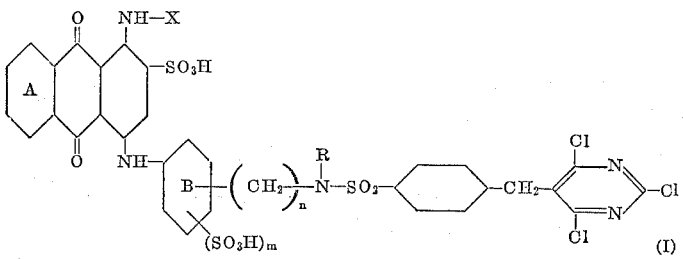

wherein
R represents hydrogen or substituted or unsubstituted alkyl having 1 to 5 carbon atoms,
X represents hydrogen or methyl,
m represents 1 or 2,
n represents 1 or 2,
and where the nucleus A may bear 1 or 2 halogen atoms or a sulfonic acid group, the nucleus B may bear further substituents, e.g. methyl and methoxy, and the group —(CH$_2$)$_n$— stands in meta- or para-position to —NH—.

A series of particularly interesting dyes of the Formula I comprises those dyes in which X represents hydrogen and the nucleus A is unsubstituted.

The process for the production of the new reactive dyes consists of acylating an anthraquinone compound of formula

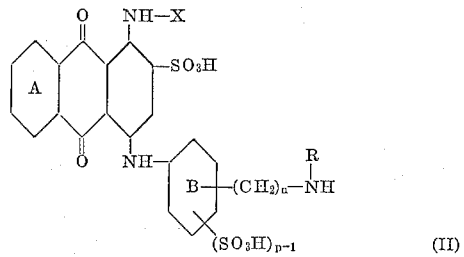

wherein p represents 1, 2 or 3, with a compound of formula

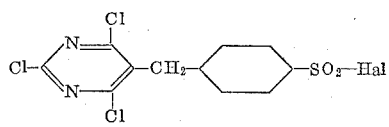

wherein Hal represents chlorine or bromine, followed by sulfonation of the acylation product when p stands for 1.

When the radical R in Formulae I and II stands for alkyl, it contains 1 to 5 carbon atoms and it may bear hydroxy, alkoxy, halogen or phenyl as substituents.

The nucleus A may contain one or two chlorine atoms in the 6 and/or 7 positions or a fluorine or bromine atom in one of the positions 6 and 7 and a sulfonic acid group in one of the positions 5, 6, 7 or 8. The starting anthraquinone compounds of Formula II may be homogeneous or they may be mixtures of compounds corresponding to that formula, e.g. a mixture of 2,5- and 2,8-disulfonic acids or of 2-monosulfonic acid and 2,6-disulfonic acid. Acylation of the compounds of Formula II with the compounds of Formula III can be carried out in aqueous or aqueous-organic medium at 20° to 100° C., or preferably 20–60° C., in the presence of acid-binding agents, such as sodium carbonate, sodium hydrogen carbonate, sodium hydroxide or the corresponding potassium compounds.

The reaction in aqueous-organic or aqueous medium can be effected at a weakly alkaline, neutral or very weakly acid reaction, but the pH range of 9 to 6 or, more particularly, 8 to 6 is preferable. To neutralize the equivalent of hydrogen halide that is formed, an acid-binding agent, e.g. sodium bicarbonate, can be added to the reaction solution or suspension at the commencement of the operation or alternatively small portions of sodium or potassium carbonate or bicarbonate in fine pulverized form or in concentrated aqueous solution can be added in the course of the reaction. Aqueous solutions of sodium or potassium hydroxide are other suitable neutralizing agents. The addition of small amounts of a wetting or emulsifying agent can accelerate the rate of the reaction.

The compounds of Formula III can be added in concentrated form, but it is more advantageous to dissolve or suspend them in two to five times the amount of dioxan, benzene, chlorobenzene, methylbenzene, dimethylbenzene or acetone, and to add the solution or suspension dropwise to a solution or suspension of the compound bearing the amino group. To ensure good yields it is advisable to employ the compound of Formula III in slight excess: at least 1.1 to 1.2 moles of this compound should be used to each amino group for condensation.

On completion of acylation the reactive dyes, when they require sulfonation, are salted out of the solution or suspension, which may have been previously neutralized, with sodium or potassium chloride or precipitated with acid, and are then filtered with suction, washed and dried.

Several methods of sulfonation are practicable. For instance, the acylation product can be dissolved at 0–20° C. in concentrated sulfuric acid, e.g. of 96–100% $H_2SO_4$ content, then weak oleum of about 20–30% $SO_3$ content is added and the solution is stirred at 0° to about 40° C., until sulfonation is complete. Alternatively, the acylation product can be dissolved at about 0–20° C. in oleum of about 5–25% $SO_3$ content and the solution stirred at 0° to about 40° C. In both methods the temperature can be decreased in proportion as the $SO_3$ content is increased. The sulfonation products can be isolated by discharging the mass onto ice or into a mixture of ice and water or ice and brine, then they can be salted out, filtered off with suction, washed and dried.

The new reactive dyes possess good solubility in water, good compatibility with salts and hard water, and good reactivity with vegetable, animal and polyamide fibers. They reserve acetate, triacetate, polyester, acrylic, polyvinyl chloride, polyvinyl acetate and polyalkylene fibers. Because of their good water solubility the proportion of unfixed dye remaining on dyed or printed cellulosic textiles can be washed off without difficulty.

The dyes are suitable for dyeing leather; for dyeing, padding and printing animal fibers, e.g. wool and silk; polyamide fibers, e.g. nylon; cellulosic fibers, e.g. cotton and linen; and regenerated cellulosic fibers, e.g. viscose and cuprammonium rayon, as well as blends of the aforenamed fibers. The optimum conditions of application vary with the type of fiber and the dyes used. Animal and polyamide fibers are dyed, printed or fixed preferably in an acid, neutral or weakly alkaline medium, e.g. in the presence of acetic, formic or sulfuric acid, ammonium sulfate, sodium metaphosphate, etc. Dyeing can also be carried out in an acetic acid to neutral medium in the presence of leveling agents, e.g. polyoxethylated fatty amines or mixtures of these and alkyl-polyglycol ethers, and the bath adjusted to a neutral or weakly alkaline reaction at the end of dyeing by the addition of small amounts of an agent of alkaline reaction, e.g. ammonia, sodium carbonate or bicarbonate, or of a compound which reacts alkaline on heating, e.g. hexamethylene tetramine or urea. The dyed material is then rinsed well and, if necessary, acidified with acetic acid. The dyeings on wool and polyamide fibers have good light fastness and excellent fastness to perspiration, washing, sea water, milling, chlorine and dry cleaning, and the majority of the dyes have good level dyeing properties on these fibers.

For applying the dyes to cellulosic fibers by dyeing, padding or printing methods, or for their fixation on the material, it is of advantage to use an alkaline medium containing, e.g. potassium or sodium carbonate or bicarbonate, hydroxide or metasilicate, sodium borate, trisodium phosphate, ammonia, etc. To prevent reduction effects in the dyeing, padding or printing of the fibers, it is of advantage to use a mild oxidizing agent, e.g. sodium 3-nitrobenzene-1-sulfonate.

The new reactive dyes are cold-dyeing types, that is to say they can be applied and fixed on cellulosic fibers at room temperature or a temperature slightly higher than room temperature, e.g. 20–40° C., from a strongly alkaline medium in the presence of, e.g., sodium hydroxide or metasilicate, in comparatively short times, e.g. 1 hour. Fixation can also be effected at higher temperatures, e.g. 80–100° C., in which case weaker alkalis, such as sodium carbonate and bicarbonate, can be employed.

The reactivity of the new reactive dyes is greater than that of the next comparable dyes in which $n$ has the value 0, i.e. dyes in which the amino group bearing the reactive group is directly linked to the phenyl nucleus.

The addition of certain quaternizable amines, such as trimethylamine, triethylene-diamine or 1,4-bis-(dimethylamino)-butene-2 or -butine-2, or of asymmetrical dimethylhydrazine, acetone - N,N - dimethylhydrazone, 2-butanone - N,N - dimethylhydrazone or N-amino-pyrrolidine, preferably in stoichiometric amounts, accelerates fixation of the dye on the fiber, which permits a reduction of the fixing temperature and/or fixing time and/or of the alkalinity of the medium or its alkaline content.

The dyeings and prints on cellulosic fibers have very good chlorine fastness and excellent wet fastness, e.g. fastness to washing, perspiration, water, sea water, rubbing, alkali, acetic acid cross dyeing and dry cleaning, and they are stable to alkaline hydrolytic influences. These good properties are due to the formation of a stable chemical linkage between the dye molecule and the cellulose molecule. Often the total amount of dye applied does not take part in the chemical reaction with the fiber. The proportion of unreacted dye is cleared from the fiber by suitable treatment, such as rinsing and/or soaping, if necessary at higher temperatures; for this purpose synthetic detergents can be used, e.g. alkylarylsulfonates such as sodium dodecylbenzenesulfonate, alkyl sulfates such as sodium lauryl sulfate, and alkyl-, mono-alkyl-phenyl- or di-alkyl-phenyl-polyglycol ethers which may be sulfated or carboxymethylated such as sodium lauryl polyglycol ether sulfate and sodium lauryl polyglycol ether oxyacetate.

In the following examples the parts and percentages are by weight and the temperatures are given in degrees centigrade.

EXAMPLE 1

22 parts of the anthraquinone dye of formula

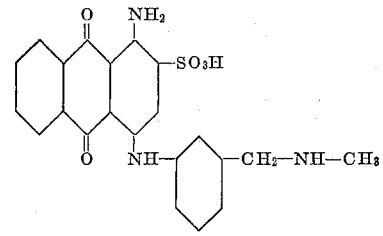

are suspended in 300 parts of 50% acetone with good stirring. The dye is dissolved by the addition to the obtained suspension of 20 parts of a 10% sodium hydroxide solution, after which it is precipitated by slowly strewing in 16 parts of sodium hydrogen carbonate in finely divided form. The pH value of the suspension is then about 8.3 19 parts of 2,4,6-trichloro-5-benzyl-pyrimidine-4'-sulfonic acid chloride are added and the suspension stirred for 16 hours at 20°. On completion of the reaction, the mass is diluted with 500 parts of water and 100 parts of a saturated sodium chloride solution. The precipitated dye is filtered off with suction, washed with a 2% sodium chloride solution and vacuum dried at 50°.

The resulting dye is entered into 120 parts of 10% oleum and sulfonated at 20–25° in order to impart to it better solubility in water. The sulfonation mass is run into a mixture of 300 parts of ice and 300 parts of saturated sodium chloride solution, on which the now readily soluble dye is precipitated, filtered off, washed with a 15% sodium chloride solution until neutral, and dried in vacuum at 50–60°. The dye thus obtained dissolves in water with a blue coloration and gives brilliant blue dyeings on cellulosic fibers.

*Padding method*

A cotton fabric is padded at room temperature with a freshly prepared liquor containing 15 g./l. of the dye of Example 1 and 2.5 ml./l. of 30% sodium hydroxide solution. It is expressed to retain about 80% of its weight of liquor, wrapped in sheets of polyethylene or other suitable plastic to prevent drying, and stored for 45 minutes at 25°. Subsequently, the fabric is rinsed with cold and then with hot water, soaped for 10 minutes with a solution of 0.3% soap in distilled water, rinsed again and dried. The blue dyeing is very fast to light, chlorine, rubbing, dry cleaning, and wet treatments, especially washing, perspiration, and cross dyeing with acetic acid.

The alkali specified above, sodium hydroxide solution, can be replaced by 5 g./l. sodium carbonate, in which case fixation requires only 1 minute at 90°.

*Printing method*

A fabric of viscose staple fiber is printed with a paste of the following composition:

20 parts of the dye of Example 1,
100 parts of urea,
410 parts of water,
450 parts of a 4% sodium alginate thickening,
10 parts of sodium 3-nitrobenzene-1-sulfonate, and
10 parts of sodium hydrogen carbonate 1000 parts The printed fabric is steamed for 10 minutes at 100–102°, rinsed in cold and then in hot water, soaped at the boil, rinsed and dried. A bright blue print having good light and wet fastness is obtained.

EXAMPLE 2

29 parts of the dye of the formula

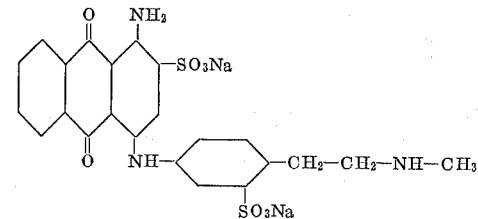

are dissolved in 300 parts of water at 40°. The pH value is adjusted to 8 with dilute sodium hydroxied solution, then 19 parts of finely pulverized 2,4,6-trichloro-5-benzylpyrimidine-4'-sulfonic acid chloride are gradually added at 40° with good stirring. The pH value is maintained at 7.5 to 8.5 by simultaneous dropwise addition of 10% sodium carbonate solution. On completion of acylation the dye is precipitated by the addition of sodium chloride, filtered off, washed with sodium chloride solution, and dried. A dye is obtained which dissolves in water to give blue solutions and dyes cellulosic fibers brilliant blue.

In the following table are set out further reactive dyes of the formula

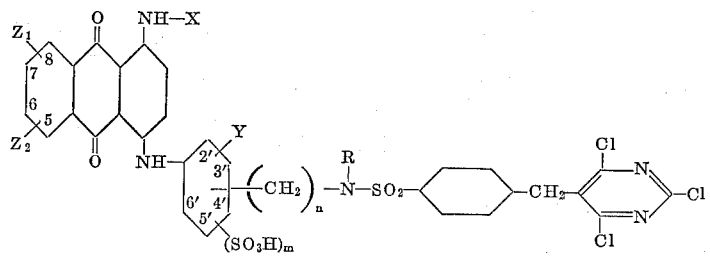

These dyes are obtained in accordance with the procedures described in Example 1 or 2 and they are defined in the table by the meanings of the symbols R, X, Y, $Z_1$, $Z_2$, $n$ and $m$, by the positions of the substituents and by the shade of the dyeings and prints obtained with them on cellulosic fibers.

| Example No. | R | X | Y | $Z_1$ | $Z_2$ | Position of $-(CH_2)_n-$ | n | m | Shade |
|---|---|---|---|---|---|---|---|---|---|
| 3 | $CH_3$ | H | H | H | H | 4' | 1 | 1 | Blue. |
| 4 | $CH_3$ | H | 4'-$CH_3$ | H | H | 3' | 1 | 1 | Do. |
| 5 | $CH_3$ | H | H | H | H | 3' | 1 | 1 | Reddish blue. |
| 6 | $CH_3$ | H | H | 6-$SO_3H$ | H | 4' | 1 | 1 | Greenish blue. |
| 7 | $CH_2-CH_2-OH$ | H | H | H | H | 3' | 1 | 1 | Blue. |
| 8 | $CH_3$ | $CH_3$ | H | H | H | 3' | 1 | 1 | Do. |
| 9 | $CH_3$ | H | H | 6-Cl | 7-Cl | 3' | 1 | 1 | Do. |
| 10 | $CH_3$ | H | H | H | H | 3' | 1 | 2 | Greenish blue. |
| 11 | $CH_3$ | H | 4'-O-$CH_3$ | H | H | 3' | 1 | 1 | Blue. |
| 12 | H | H | H | 5/8-$SO_3H$ | H | 3' | 1 | 1 | Do. |
| 13 | $CH_2-CH_2-OH$ | H | H | H | H | 4' | 2 | 1 | Do. |
| 14 | $CH_2-CH_2-OH$ | H | H | H | H | 4' | 1 | 1 | Do. |
| 15 | $C_2H_5$ | H | H | H | H | 4' | 1 | 1 | Do. |
| 16 | $CH_3$ | H | H | H | H | 3' | 1 | 2 | Do. |
| 17 | H | H | H | H | 7-Cl | 4' | 1 | 2 | Greenish blue. |
| 18 | $CH_3$ | H | H | H | H | 3' | 1 | 1 | Blue. |
| 19 | $CH_3$ | H | H | 7-$SO_3H$ | H | 3' | 1 | 1 | Greenish blue. |
| 20 | $CH_3$ | H | H | 5-$SO_3H$ | H | 4' | 1 | 1 | Blue. |
| 21 | $CH_3$ | H | H | 6 Br | H | 3' | 1 | 2 | Greenish blue |
| 22 | $CH_3$ | H | $CH_3$ | 6 F | H | 3' | 1 | 2 | Do. |
| 23 | $CH_3$ | H | H | H | H | 4' | 2 | 1 | Blue. |
|  |  |  |  |  |  | 3' |  |  | Do. |

Formulae of representative dyes of the foregoing examples are as follows:
EXAMPLE 1
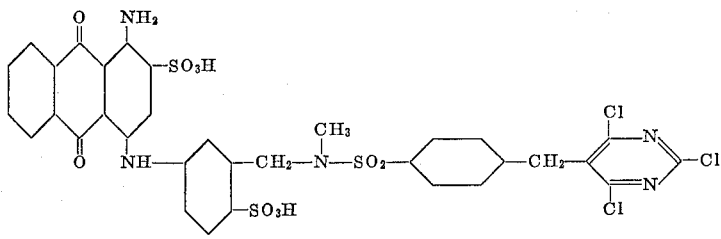
EXAMPLE 2
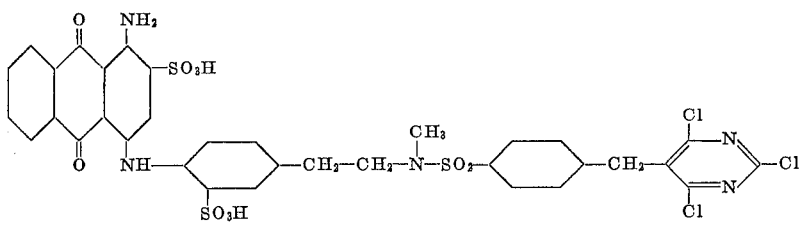
EXAMPLE 3
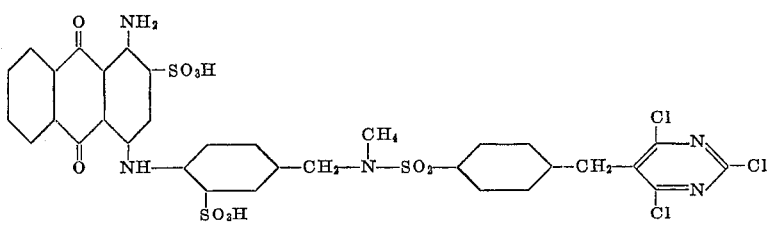
EXAMPLE 4
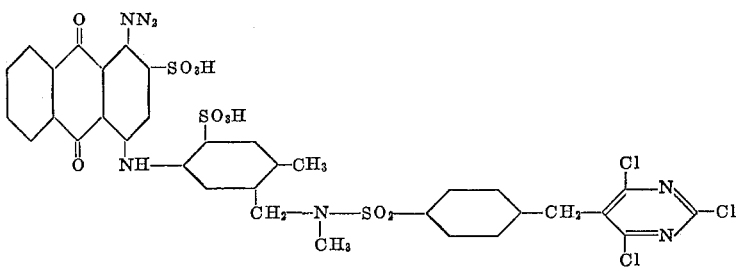
EXAMPLE 7
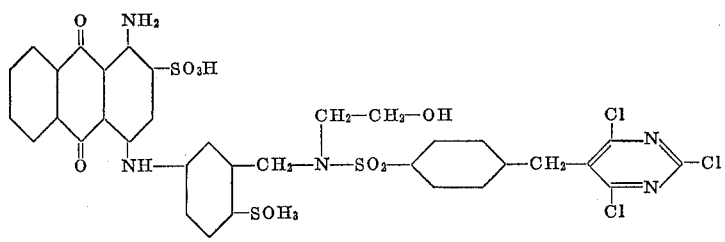
Having thus disclosed the invention, what I claim is
1. A reactive dye of the formula
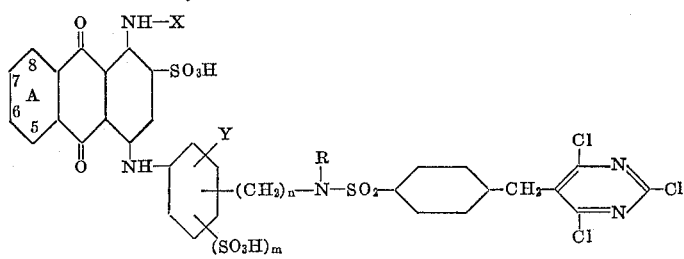

wherein
R is a member selected from the group consisting of hydrogen, alkyl and lower hydroxyalkyl.
X is a member selected from the group consisting of hydrogen and methyl,
Y is a member selected from the group consisting of hydrogen, methyl and methoxy,
$n$ is one of the integers 1 and 2,
$m$ is one of the integers 1 and 2,
any substituents on the nucleus A are selected from the group consisting of chlorine, bromine, and fluorine in the positions 6 and 7 and $-SO_3H$ in one of the posi- 5,6,7, and 8, and the group $-(CH_2)_n-$ stands in one of the meta- and para-positions with respect to $-NH-$.

2. A reactive dye of the formula

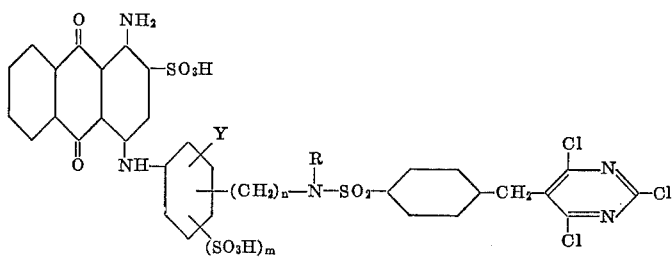

wherein
R is a member selected from the group consisting of hydrogen, lower alkyl and lower hydroxyalkyl,
Y is a member selected from the group consisting of hydrogen, methyl and methoxy,
$n$ is one of the integers 1 and 2
$m$ is one of the integers 1 and 2
and the group $-(CH_2)_n-$ stands in one of the meta- and para-positions with respect to $-NH-$.

3. The reactive dye of the formula

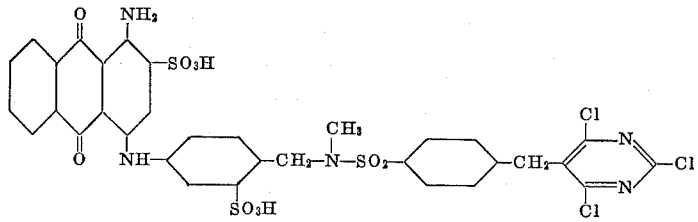

4. The reactive dye of the formula

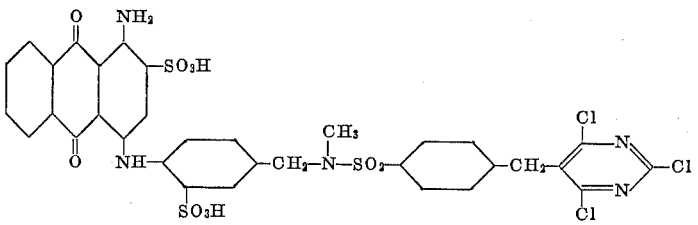

5. The reactive dye of the formula

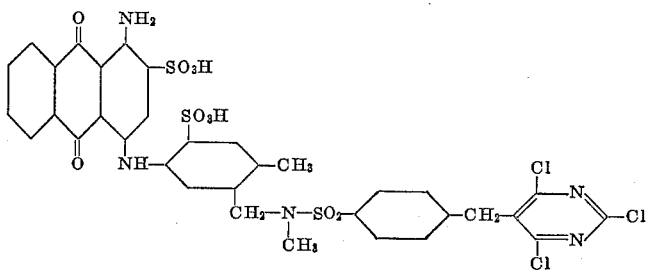

6. The reactive dye of the formula

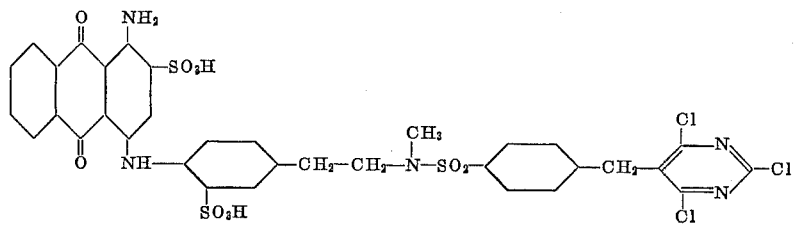

7. The reactive dye of the formula
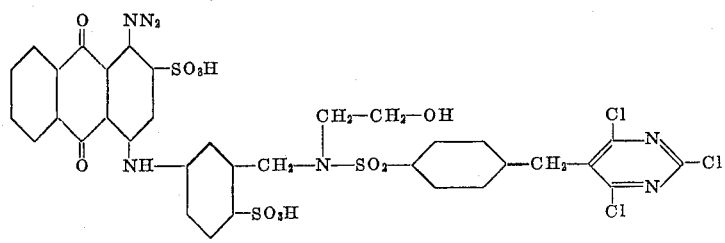
No references cited.
ALEX MAZEL, *Primary Examiner.*
MARY O'BRIEN, *Assistant Examiner.*

UNITED STATES PATENT OFFICE
CERTIFICATE OF CORRECTION

Patent No. 3,271,397                                September 6, 1966

Peter Bitterli

It is hereby certified that error appears in the above numbered patent requiring correction and that the said Letters Patent should read as corrected below.

Column 2, line 9, for "7 and" read -- 7 or --; line 10, for "7 or" read -- 7 and --.

Signed and sealed this 1st day of August 1967.

(SEAL)
Attest:

Edward M. Fletcher, Jr.                         EDWARD J. BRENNER
Attesting Officer                                Commissioner of Patents